United States Patent [19]

Thomas

[11] Patent Number: 5,776,245
[45] Date of Patent: Jul. 7, 1998

[54] METHOD FOR HYDROPHOBING GYPSUM

[75] Inventor: Bryan Thomas, Barry, United Kingdom

[73] Assignee: Dow Corning Limited, Barry, Wales

[21] Appl. No.: 812,097

[22] Filed: Mar. 4, 1997

[30] Foreign Application Priority Data

Mar. 19, 1996 [GB] United Kingdom ............... 9605706

[51] Int. Cl.$^6$ ................ C04B 24/40; C04B 11/00; C09D 183/04
[52] U.S. Cl. ............... 106/781; 106/2; 106/287.11; 106/711; 106/782
[58] Field of Search ............... 106/2, 781, 287.11, 106/711, 782

[56] References Cited

U.S. PATENT DOCUMENTS

| | | | |
|---|---|---|---|
| 3,579,540 | 5/1971 | Ohlhausen | 523/169 |
| 4,643,771 | 2/1987 | Steinbach et al. | 106/111 |
| 4,835,014 | 5/1989 | Roth et al. | 427/299 |
| 4,851,047 | 7/1989 | Demlehner et al. | 106/111 |
| 5,051,129 | 9/1991 | Cuthbert et al. | 106/2 |
| 5,073,195 | 12/1991 | Cuthbert et al. | 106/2 |
| 5,110,684 | 5/1992 | Cooper | 428/447 |
| 5,135,805 | 8/1992 | Sellers et al. | 428/302 |
| 5,205,860 | 4/1993 | Narula et al. | 106/2 |
| 5,209,775 | 5/1993 | Bank et al. | 106/2 |
| 5,300,327 | 4/1994 | Stark-Kasley et al. | 427/387 |
| 5,336,715 | 8/1994 | Sejpka et al. | 524/765 |
| 5,421,866 | 6/1995 | Stark-Kasley et al. | 106/2 |
| 5,449,712 | 9/1995 | Gierke et al. | 106/2 |
| 5,496,401 | 3/1996 | Yang | 106/2 |
| 5,624,481 | 4/1997 | Gerhardiner et al. | 106/2 |
| 5,626,668 | 5/1997 | Gerhardinger et al. | 106/2 |

FOREIGN PATENT DOCUMENTS

| | | | |
|---|---|---|---|
| 844273 | 8/1960 | United Kingdom | 106/2 |
| 949939 | 2/1964 | United Kingdom | 106/2 |
| 2 062 607 | 10/1979 | United Kingdom | C04B 31/44 |
| 92/06101 | 4/1992 | WIPO | 106/2 |

*Primary Examiner*—Anthony Green
*Attorney, Agent, or Firm*—Arne R. Jarnholm

[57] ABSTRACT

A method for preparing an aqueous gypsum mixture having hydrophobic additive substantially uniformly dispersed therein, which method comprises admixing in water gypsum, a silane of the general formula $(RO)_3SiR'$ or the general formula $(RO)_2SiRR'$ and non-emulsified polysiloxane of the general formula;

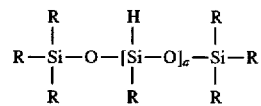

wherein each R is the same or different and represents a hydrocarbon group having from one to eight carbon atoms. R' represents a lower alkyl group which is optionally substituted by an amino, amino-loweralkylene-amino or dialkylenetriamine group, and a has an average value of between 20 and 200. The silane is preferably N-(2-aminoethyl)-3-aminopropyltrimethoxysilane and the polysiloxane preferably trimethyl end-blocked linear methylhydrogen polysiloxane. The method may further include adding surfactant. Also disclosed is a gypsum product which includes gypsum mixture prepared according to the above method.

10 Claims, No Drawings

METHOD FOR HYDROPHOBING GYPSUM

The present invention relates to a method for hydrophobing gypsum, more particularly to a method for hydrophobing gypsum using organosilicon compounds as hydrophobic additive.

Water-resistance can be an important factor in production of certain gypsum products, such as plasterboard gypsum blocks, or mouldings. Absorption of water can cause staining, mildew, expansion and general deterioration/degradation of gypsum products. Hence, various techniques have been proposed to render gypsum products more hydrophobic, such as by surface treatment with hydrophobing agent, for example by spraying, brushing or rolling such an agent thereon or by immersing gypsum products into a solution containing said agent, or by admixing hydrophobing agent with gypsum powder prior to formation of gypsum products, for example prior to moulding blocks or forming boards.

The use of organosilicon compounds to improve the water-repellency of a substrate by surface treatment thereof is well known in the art. U.S. Pat. No. 3,579,540 discloses use of a mixture containing alkylpolysiloxane and mineral acid; U.S. Pat. No. 4,835,014 discloses the application of water to a surface to be treated followed by a solution containing organosilicon compound and water-immiscible solvent; U.S. Pat. No. 5,051,129 discloses a masonry water repellent composition containing an aqueous solution of alkyltrialkoxysilane and silane coupling agent (see also U.S. Pat. No. 5,073,195 divided therefrom and U.S. Pat. No. 5,209,775); U.S. Pat. No. 5,205,860 discloses a surface treating composition containing water, alkyltrialkoxysilane, water soluble silane coupling agent and aqueous silicone emulsion containing organic tin salt; U.S. Pat. No. 5,300,327 (a continuation in part of U.S. Pat. No. 5,051,129) discloses a surface treatment composition comprising alkyltrialkoxysilane, amino- or quaternary ammonium organofunctional trialkoxysilane coupling agent, and a blend of petroleum and synthetic hydrocarbon waxes; and U.S. Pat. No. 5,421,866 discloses a surface treatment composition comprising alkoxysilane, amino- or quaternary ammonium organofunctional silane coupling agent, and isobutylene polymer or oligomer.

Surface treatment with hydrophobing agent can be a convenient method of increasing the water repellency of a pre-formed substrate, such as a pre-moulded gypsum block or plasterboard; however, after such treatment the hydrophobing agent is only dispersed throughout the surface layers of the substrate with the bulk of the substrate material remaining mainly untreated.

An alternative method for rendering a substrate water repellent is to admix hydrophobing agent with the substrate material, such as gypsum powder, prior to formation of the substrate, for example prior to moulding blocks or forming boards. Various such methods are known in the art and, as for the aforementioned surface treatment method, organosilicon compounds have been widely used as hydrophobing agents therein. GB 2062607A discloses manufacture of a gypsum hardened body from a mixed material comprising gypsum and slag with powdered additive coated with hydrophobic diorganopolysiloxane; U.S. Pat. No. 4,643,771 discloses production of water repellent plaster moulding by forming a foam of water, surfactant and polyalkylhydrogensiloxane, adding the foam to a water paste of plaster powder and letting the mixture set; U.S. Pat. No. 4,851,047 discloses a process for preparing water repellent articles from gypsum powder containing hydrophobic agents in which the hydrophobic agents are prepared by spray drying a mixture containing water, organopolysiloxane and water soluble film forming polymer; and U.S. Pat. No. 5,336,715 discloses water dilutable organopolysiloxane compositions for use as hydrophobing agents for materials such as concrete, gypsum and paint which comprises a salt of a water-soluble organic or inorganic acid, an organopolysiloxane having at least one SiC-bonded organic radical containing basic nitrogen, and an alkoxylated alcohol.

Pre-mixing of hydrophobing additive with substrate material provides substantially uniform dispersion of hydrophobing additive throughout the mixture and hence the body of the formed substrate.

U.S. Pat. No. 5,110,684 discloses a method of rendering masonry architectural building materials, such as gypsum, water repellent by incorporating into the material an additive which is a mixture of (i) water soluble silane coupling agent, e.g. N-(2-aminoethyl)-3-aminopropyltrimethoxysilane, and (ii) an emulsion which includes water, at least one surfactant and a siloxane fluid, e.g. linear methylhydrogen siloxane polymer, methylhydrogen-methylalkyl siloxane polymer, and copolymers thereof.

A problem with the hydrophobing method taught in this reference, and indeed many such methods conventionally employed in the art, is that emulsions (e.g. component (ii) in said reference) or emulsifying agents are used, which are by nature hydrophilic and hence diminish the hydrophobic properties imparted to the material by the hydrophobic additive.

We have found that employment of non-emulsified hydrophobic additive can overcome the aforementioned problem of diminished hydrophobic properties.

According to the present invention there is provided a method for preparing an aqueous gypsum mixture having hydrophobic additive substantially uniformly dispersed therein, which method comprises admixing in water, gypsum, a silane of the general formula (RO)$_3$SiR' or of the general formula (RO)$_2$SiRR', and non-emulsified polysiloxane of the general formula:

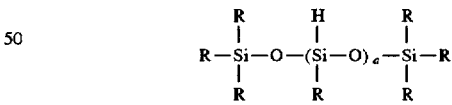

wherein each R is the same or different and represents a hydrocarbon group having from one to eight carbon atoms, R' represents a lower alkyl group which is optionally substituted by an amino, amino-loweralkyl-amino or dialkylenetriamine group, and a has an average value of between 20 and 200.

The polysiloxane of the above general formula should consist largely of methylhydrogen siloxane units, but may contain other species of siloxane unit, for example dimethyl siloxane units, provided hydrophobing performance is not affected. Preferably at least 75% of the total siloxane units are methylhydrogen units, more preferably at least 90% (e.g. 95%).

The use of non-emulsified ingredients in the method of the present invention can remove the disadvantage of diminishment of hydrophobic properties in the gypsum mixture which arises when emulsified ingredients are used.

The term "hydrocarbon group having from one to eight carbon atoms" includes lower alkyl groups and phenyl groups.

The term "lower alkyl" refers to alkyl groups having from one to eight carbon atoms, for example methyl, ethyl, propyl, butyl, pentyl, hexyl, heptyl, octyl and structural isomers thereof.

The term "dialkylenetriamine" refers to amino-alkylene-amino-alkylene-amino groups in which the alkylene groups preferably have from one to three carbon atoms, for example methylene, ethylene, and propylene.

In the silane group R is preferably methyl or ethyl, and R' is preferably a propyl group substituted by an amino, an amino-loweralkyl-amino (for example 2-aminoethylamino), or dialkylenetriamine (for example diethylenetriamine) group. Preferred examples of silanes for use in the present invention are 3-aminopropyltrimethoxysilane, 3-aminopropyltriethoxysilane, N-(2-aminoethyl)-3-aminopropyltrimethoxysilane, N-(2-aminoethyl)-3-amino-2-methylpropyldimethoxymethylsilane, 3-aminopropyldiethoxymethylsilane and trimethoxysilylpropyldiethylenetriamine, the most preferred being N-(2-aminoethyl)-3-aminopropyltrimethoxysilane. The silane may be added to the gypsum mixture neat or in aqueous solution for easier handling, and is preferably present in an amount from 0.025 to 0.3% by weight of gypsum.

In the polysiloxane group R is preferably methyl, i.e. the non-emulsified polysiloxane used in the present invention preferably comprises trimethyl end-blocked linear methylhydrogen polysiloxane, with a defined above preferably having an average value of between 40 and 80. The non-emulsified polysiloxane is preferably present in the gypsum mixture in an amount from 0.1 to 1.0% by weight of gypsum.

Gypsum mixture prepared according to the present invention may also include a soluble surfactant, i.e. a soap. Surfactant such as soap facilitates aeration of the gypsum mixture and can thus be used to regulate and change the density of the gypsum mixture. However, addition of such surfactant can diminish the hydrophobic properties imparted by the hydrophobic additives. If used, such surfactant is typically present in an amount of approximately 0.1% by weight of gypsum.

Gypsum mixture prepared according to the method of the present invention may further include organic (for example cellulosic or paper) or mineral/glass fibres in admixture to modify its physical properties.

According to the method of the present invention the gypsum, silane, non-emulsified polysiloxane and optional surfactant are added to water and mixed. The order in which these ingredients are added to the water is not crucial, and hence no substantial modifications to conventional manufacturing processes are needed. However, the silane and non-emulsified polysiloxane should be added separately with mixing prior to the addition of the gypsum for reasons of safety.

For formation of gypsum products, after mixing the gypsum is allowed to set in a suitable cast, mould, or the like, to provide the desired product shape and dried in a drier or oven. For board production, the gypsum mixture is typically poured onto a conveyer belt, allowed to set, cut to length and dried. The conveyer belt may be covered with paper to provide paper coated board. The drying time varies according to the bulk of gypsum mixture to be dried, for example a moulded gypsum product such as a block may typically be dried for approximately 48 hours, whereas gypsum board may typically require only 2 hours of drying.

The present invention further provides gypsum product, for example gypsum blocks or plasterboard, which includes gypsum mixture prepared according to the method of the present invention.

Embodiments of the present invention will now be described in detail by way of example. In the Examples all viscosity measurements are made at 25° C.

EXAMPLE 1

Comparison of Gypsum Product Samples Containing Differing Amounts of the Same Silane and Polysiloxane 1) Preparation of gypsum product samples N-(2-aminoethyl)-3-aminopropyltrimethoxysilane and unemulsified trimethyl end-blocked methyl hydrogen polysiloxane (viscosity 20–40 cSt) were added to 260 ml of water, in different amounts for each test sample (see Tables 1 to 3 below), and whisked. To this solution was added 400 g gypsum and the mixture whisked again. Sample blocks were prepared by pouring the gypsum mixture into 5×5×2 cm moulds and leaving for 25 minutes, followed by equilibration for 3 hours, from the time of mixing, at 950° C. to remove excess water. Equilibration was completed by storing the test samples at 400° C. overnight.

Comparative blank sample blocks were prepared by the method described above without addition of silane and polysiloxane additive.

2) Sample testing

The mass of each sample block after equilibration was recorded, following which the blocks were immersed in water for 2 hours at constant hydrostatic pressure. Each sample block was then reweighed to give the level of water adsorption (%)

3) Test results

The results of the sample testing described in 2) above are shown in Tables 1 to 3 below:

TABLE 1

| GYPSUM LOT 1 | | |
|---|---|---|
| Silane % | Polysiloxane % | Water Adsorption % |
| nil | nil | 32 |
| 0.025 | 0.25 | 2.5 |
| 0.05 | 0.27 | 2.6 |
| 0.075 | 0.45 | 1.5 |
| 0.12 | 0.18 | 1.0 |
| 0.18 | 0.27 | 0.7 |
| 0.3 | 0.45 | 1.6 |

TABLE 2

GYPSUM LOT 2

| Silane % | Polysiloxane % | Water Adsorption % |
| --- | --- | --- |
| nil | nil | 34 |
| 0.025 | 0.49 | 4.0 |
| 0.18 | 0.27 | 5.0 |
| 0.3 | 0.45 | 1.5 |

TABLE 3

GYPSUM LOT 3

| Silane % | Polysiloxane % | Water Adsorption % |
| --- | --- | --- |
| nil | nil | 31 |
| 0.075 | 0.15 | 4.0 |
| 0.125 | 0.225 | 1.1 |
| 0.175 | 0.3 | 1.5 |
| 0.2 | 0.375 | 1.4 |

N.B. Silane and polysiloxane % are % by weight of gypsum.

EXAMPLE 2

Comparison of gypsum product samples containing equal amounts of the same siloxane with equal amounts of different silanes 1) Preparation of gypsum product samples Gypsum product samples containing silanes A to E below were prepared according to the method of Example 1:

A—$(MeO)_3Si(CH_2)_3NH(CH_2)_2NH_2$ (i.e. as per Example 1)
B—$(EtO)_2.Me.Si(CH_2)_3NH_2$
C—$(EtO)_3Si(CH_2)_3NH_2$
D—$(MeO)_3Si(CH_2)_3NH_2$
E—$(MeO)_2.Me.SiCH_2CH(CH_3)CH_2NH(CH_2)_2NH_2$ The siloxane was the same as that used in Example 1. The silane was added in an amount of 0.125% and the siloxane in an amount of 0.375%, both based on weight of gypsum.

Sample blocks were prepared and dried as per Example 1.

2) Sample testing

Sample blocks were tested as per Example 1.

3) Test results

The results of the sample testing described in 2) above are shown in Table 4 below:

TABLE 4

| Silane | Water Adsorption % |
| --- | --- |
| A | 3.1 |
| B | 2.3 |
| C | 5.1 |
| D | 4.5 |
| E | 2.5 |

COMPARATIVE EXAMPLE 1

1) Preparation of gypsum product samples

Gypsum product samples were prepared and dried according to the method of Example 1 with either silane or polysiloxane added, not both. The amounts of silane or polysiloxane added to each sample are shown in Table 5 below.

2) Sample testing

Sample blocks were tested as per Example 1.

3) Test results

The results of the sample testing described in 2) above are shown in Table 5 below:

TABLE 5

| Silane % | Polysiloxane % | Water Adsorption % |
| --- | --- | --- |
| nil | 0.5 | 9.4 |
| nil | 0.3 | 7.7 |
| nil | 0.1 | 25.0 |
| 0.25 | nil | 30.2 |
| 0.50 | nil | 30.8 |
| 1.00 | nil | 30.5 |

Silane -N-(2-aminoethyl)-3-aminopropyltrimethoxysilane
Polysiloxane—unemulsified trimethyl end-blocked methyl hydrogen polysiloxane (viscosity 20–40 cSt) Silane % and polysiloxane % are % by weight of gypsum.

COMPARATIVE EXAMPLE 2

Comparative Test Data with Emulsion Containing Gypsum Mixtures and Gypsum Mixture Not Containing Silane 1) Preparation of gypsum product samples Three polysiloxane emulsions each containing 30% trimethyl end-blocked methyl hydrogen polysiloxane (viscosity 20–40 CST) together with 1%, 3%, and 5% emulsifier respectively (remainder water) were prepared using a high shear mixer. Each emulsion was added to gypsum in an amount of 1% by weight of gypsum, mixed and gypsum sample blocks prepared and dried as per Example 1. In addition, samples were prepared containing the same amount of siloxane but no emulsifier.

2) Sample testing

The sample blocks were tested as per Example 1.

3) Test results

The results of the sample testing described in 2) are shown in Table 6 below:

TABLE 6

| Emulsifier % | Water Adsorption % |
| --- | --- |
| 0 | 8 |
| 1 | 33 |
| 3 | 31 |
| 5 | 31 |

That which is claimed is:

1. A method for preparing an aqueous gypsum mixture having hydrophobic additive substantially uniformly dispersed therein, which method comprises admixing in water gypsum, a silane selected from the group consisting of silanes of the general formula $(RO)_3SiR'$ and the general formula $(RO)_2SiRR'$, and a non-emulsified polysiloxane of the general formula;

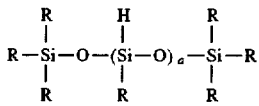

wherein each R is a hydrocarbon group having from one to eight carbon atoms, R' represents a lower alkyl group which is optionally substituted by a substituent selected from the group consisting of amino, amino-loweralkylene-amino and dialkylenetriamine groups, and a has an average value of between 20 and 200.

2. A method according to claim 1 wherein each silane R group is selected from the group consisting of methyl and ethyl groups, and R' is a propyl group substituted by a substituent selected from the group consisting of amino, amino-lower alkyl-amino, and dialkylenetriamine groups.

3. A method according to claim 1 wherein the silane is N-(2-aminoethyl)-3-aminopropyltrimethoxysilane.

4. A method according to claim 1 wherein the polysiloxane comprises trimethyl end-blocked linear methylhydrogen polysiloxane for which a has an average value of between 40 and 80.

5. A method according to claim 1 wherein the silane is present in an amount from 0.025 to 0.3% by weight of gypsum.

6. A method according to claim 1 in which the polysiloxane is present in an amount from 0.1 to 1.0% by weight of gypsum.

7. A method according to claim 1 which further includes adding surfactant.

8. A method according to claim 7 wherein the surfactant is present in an amount of approximately 0.1% by weight of gypsum.

9. A method according to claim 1 which further includes adding fibres selected from the group consisting of organic and mineral/glass fibres.

10. A gypsum product which includes gypsum mixture prepared by a method which comprises admixing in water gypsum, a silane selected from the group consisting of silanes of the general formula $(RO)_3SiR'$ and the general formula $(RO)_2SiRR'$, and a non-emulsified polysiloxane of the general formula:

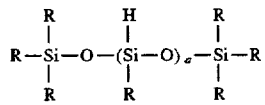

wherein each R is a hydrocarbon group having from one to eight carbon atoms, R' represents a lower alkyl group which is optionally substituted by a substituent selected from the group consisting of amino, amino-loweralkylene-amino and dialkylenetriamine groups, and a has an average value of between 20 and 200.

* * * * *